(12) United States Patent
Carciofini et al.

(10) Patent No.: US 7,958,500 B2
(45) Date of Patent: Jun. 7, 2011

(54) METHOD FOR DETERMINING RANGES FOR ALGORITHMIC VARIABLES FOR A PROCESSOR THAT USES FIXED POINT ARITHMETIC

(75) Inventors: James C. Carciofini, Centerville, MN (US); Daniel P. Johnson, Fridley, MN (US); Erik Lindquist, Minneapolis, MN (US)

(73) Assignee: Honeywell International Inc., Morristown, NJ (US)

( * ) Notice: Subject to any disclaimer, the term of this patent is extended or adjusted under 35 U.S.C. 154(b) by 1296 days.

(21) Appl. No.: 11/533,175

(22) Filed: Sep. 19, 2006

(65) Prior Publication Data

US 2007/0169048 A1    Jul. 19, 2007

Related U.S. Application Data

(60) Provisional application No. 60/718,911, filed on Sep. 20, 2005.

(51) Int. Cl.
*G06F 9/45* (2006.01)
(52) U.S. Cl. .......................... 717/151; 717/154; 717/159
(58) Field of Classification Search ......................... None
See application file for complete search history.

(56) References Cited

U.S. PATENT DOCUMENTS 6,522,992 B1 *  2/2003  McCall et al. ................ 702/141
7,587,277 B1 *  9/2009  Wells ............................ 701/220

OTHER PUBLICATIONS

Constantinides, George A. et al.; "Wordlength Optimization for Linear Digital Signal Processing"; Oct. 2003; IEEE Transactins on Computer-Aided Desing of Integrated Circuits and Systems, vol. 22, No. 10; pp. 1432-1442.*
Kim, Seehyun et al.; "Fixed-Point Optimization Utility for C and C++ Based Digital Signal Processing Programs"; Nov. 1998; IEEE Transactions on Circuits and Systems-II: Analog and Digital Signal Processing, vol. 45, No. 11; pp. 1455-1464.*
Kum, Ki-Il et al.; "Combined Word-Length Optimization and High-Level Synthesis of Digital Signal Processing Systems"; Aug. 2001; IEEE Transactions on Computer-Aided Design of Integrated Circuits and Systems, vol. 20, No. 8; pp. 921-930.*
Shi, Changchun et al.; "An Automated Floating-Point to Fixed-Point Conversion Methodology"; 2003; IEEE; pp. 529-532.*
Shi, Changchun et al.; "Automated Fixed-point Data-type Optimization Tool for Signal Processing and Communication Systems"; 2004; ACM; pp. 478-483.*
Cantin, M.-A. et al.; "A Comparison of Automatic Word Length Optimization Procedures"; 2002; 2002 IEEE International Symposium on Circuits and Systems; II-612 to II-615.*

* cited by examiner

*Primary Examiner* — Omar F. Fernandez Rivas
*Assistant Examiner* — Stanley K Hill
(74) *Attorney, Agent, or Firm* — Fogg & Powers LLC

(57) ABSTRACT

A method of determining ranges for algorithmic variables for a processor that uses fixed point arithmetic is provided. The method comprises expressing overflow requirements of processor instructions as inequalities. The method also expresses precision requirements and expressiveness requirements as inequalities and merit functions. A global constraint and optimizer tool is used to find ranges for algorithmic variables based on the inequalities and the merit functions. The use of constraint equation solving and optimization finds optimal algorithmic ranges that provide overflow-free arithmetic as well as optimal expressiveness and precision.

19 Claims, 2 Drawing Sheets

METHOD FOR DETERMINING RANGES FOR ALGORITHMIC VARIABLES FOR A PROCESSOR THAT USES FIXED POINT ARITHMETIC

This application claims the benefit of priority to U.S. Provisional Application No. 60/718,911, filed on Sep. 20, 2005, the disclosure of which is herein incorporated by reference.

BACKGROUND

The effective use of guided munitions requires electronic hardware and software components to survive and function normally at over 15,000 g's. Such stringent demands are required for precision guided munitions (PGMs) that use an inertial measurement unit (IMU) for inertial guidance in case of global positioning signal jamming. Functional, gun-hardened IMUs can be produced using micro-electro-mechanical systems (MEMS) technology. The MEMS technology typically refers to small mechanical elements micro-machined into a silicon substrate, which also contains microcircuitry in the form of embedded microprocessors.

Such microprocessors typically use fixed point arithmetic, which is a manner of doing arithmetic on a computer where a fixed number of decimal (or binary) digits is kept after the decimal point, and any remaining digits are rounded. It is necessary to determine valid ranges for algorithmic variables using fixed point arithmetic. Determining valid ranges is essential in avoiding arithmetic overflow errors, and determining ranges of sufficient width is essential in preserving arithmetic expressiveness and precision.

SUMMARY

The present invention relates to a method of determining ranges for algorithmic variables for a processor that uses fixed point arithmetic. The method comprises expressing overflow requirements of processor instructions as inequalities. The method also expresses precision requirements and expressiveness requirements as inequalities and merit functions. A global constraint and optimizer tool is used to find ranges for algorithmic variables based on the inequalities and the merit functions. The use of constraint equation solving and optimization finds optimal algorithmic ranges that provide overflow-free arithmetic as well as optimal expressiveness and precision.

BRIEF DESCRIPTION OF THE DRAWINGS

Features of the present invention will become apparent to those skilled in the art from the following description with reference to the drawings. Understanding that the drawings depict only typical embodiments of the invention and are not therefore to be considered limiting in scope, the invention will be described with additional specificity and detail through the use of the accompanying drawings, in which.

DETAILED DESCRIPTION

Figure 1:
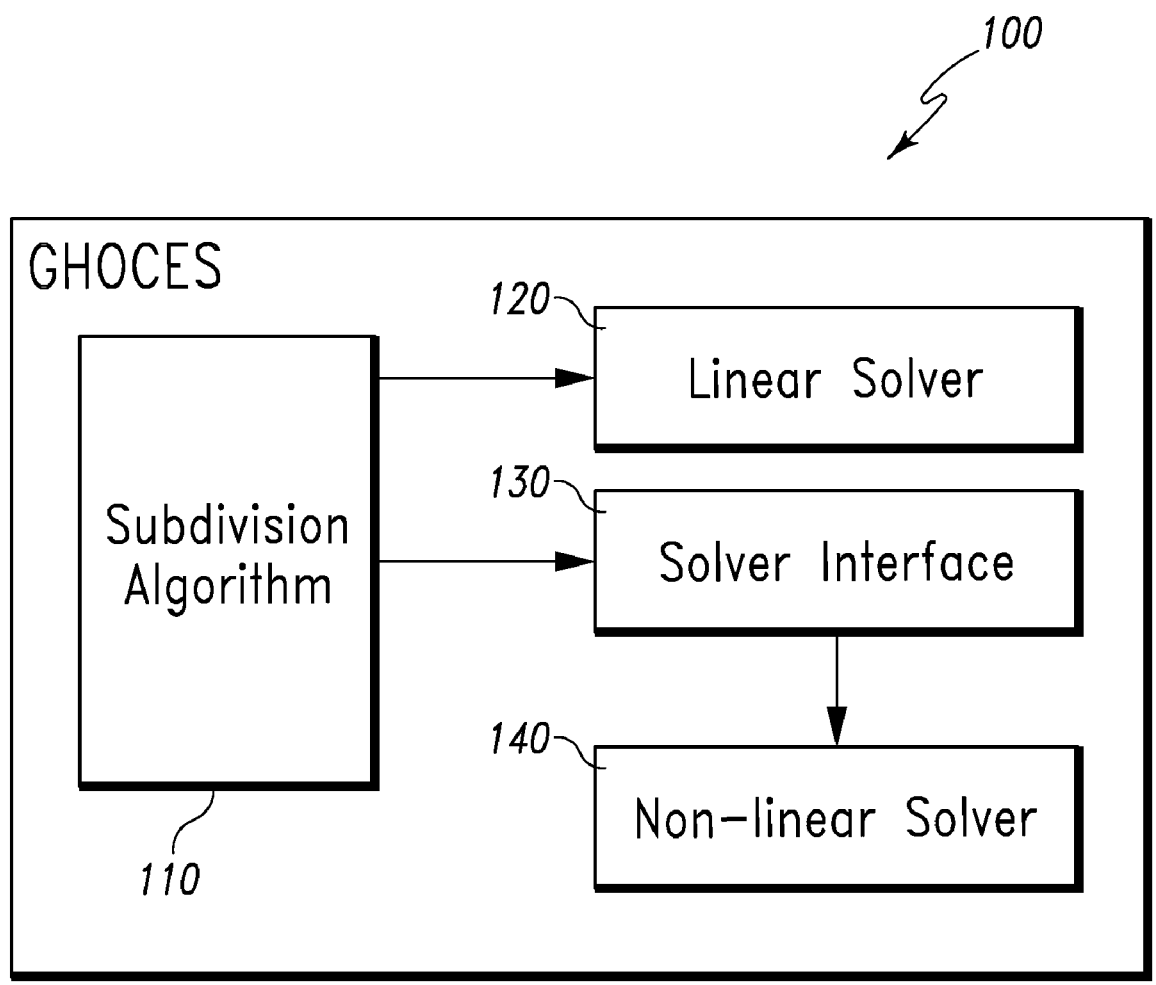
FIG. 1 is a block diagram of the global hybrid optimization constraint equation solver tool used in the method of the invention for overflow analysis.

In the following detailed description, embodiments are described in sufficient detail to enable those skilled in the art to practice the invention. It is to be understood that other embodiments may be utilized without departing from the scope of the present invention. The following detailed description is, therefore, not to be taken in a limiting sense.

The present invention relates to a method for determining ranges for algorithmic variables for a processor that uses fixed point arithmetic. The method uses constraint equation solving and optimization to find optimal ranges that guarantee overflow-free arithmetic, as well as optimal expressiveness and precision. In particular, the method expresses overflow requirements of microprocessor instructions as inequalities such as quadratic inequalities. The method also expresses precision requirements and expressiveness requirements as inequalities and merit functions, such as quadratic inequalities and quadratic merit functions. A global constraint solver and optimizer tool is used to find ranges for arithmetic variables based on the inequalities and the merit functions. The algorithmic variables can be reformulated to eliminate variables common to both sides of the inequalities.

The method of the invention is used to identify the maximum range for each variable in sensor compensation algorithms such that fixed point scaling overflows cannot occur. The maximum range, in general, is not equal to the range defined by the variable's fixed point scaling. The maximum range is referred to as the operational range. The constrained variable ranges ensure that the operational ranges do not exceed the fixed point scaling ranges.

Instructions for carrying out the various methods, process tasks, calculations, control functions, and the generation of signals and other data used in the operation of the method of the invention are implemented, in some embodiments, in software programs, firmware, or computer readable instructions. These instructions are typically stored on any appropriate computer readable medium used for storage of computer readable instructions or data structures. Such computer readable media can be any available media that can be accessed by a general purpose or special purpose computer or processor.

By way of example, and not limitation, such computer readable media can include floppy disks, hard disks, ROM, flash memory ROM, nonvolatile ROM, EEPROM, RAM, CD-ROM, DVD-ROM, or other optical disk storage, magnetic disk storage, or other magnetic storage devices, or any other medium that can be used to carry or store desired program code means in the form of computer executable instructions or data structures. When information is transferred or provided over a network or another communications connection (either hardwired, wireless, or a combination of hardwired or wireless) to a computer, the computer properly views the connection as a computer readable medium. Thus, any such connection is properly termed a computer readable medium. Combinations of the above are also included within the scope of computer readable media. Computer executable instructions comprise, for example, instructions and data which cause a general purpose computer, special purpose computer, or special purpose processing device to perform a certain function or group of functions.

Although not required, the method of the invention will be described in the general context of computer readable instructions, such as program modules, being executed by a processor. Generally, program modules include routines, programs, objects, data components, data structures, algorithms, etc. that perform particular tasks or implement particular abstract data types. Computer executable instructions, associated data structures, and program modules represent examples of the program code means for executing steps of the methods disclosed herein. The particular sequence of such executable instructions or associated data structures represents examples of corresponding acts for implementing the functions described in such steps.

While the present method is described in the context of use in a micro-electro-mechanical systems (MEMS) inertial measurement unit (IMU), it should be understood that the method can be used in any embedded microprocessor operational software utilizing fixed point arithmetic to enforce constraints and guarantee that fixed point overflow cannot occur. The method of the invention is described in further detail in the following sections.

Approach and Methodology

The overflow analysis used in the present method can be performed with the global hybrid optimal constraint equation solver (GHOCES), which is a linear programming optimization tool that can be used as a simultaneous equation solver. The GHOCES tool is an example of a program code means comprising a plurality of program modules that can be stored in memory devices in the microprocessor device.

FIG. 1 is a block diagram of a GHOCES tool 100 showing the relationship of the various program modules therein. The GHOCES tool 100 includes a subdivision algorithm 110 (e.g., based on Java programming software), which is in operative communication with a linear solver 120 (e.g., CPLEX) and a solver interface 130 (e.g., AMPL). The solver interface 130 is in operative communication with a non-linear solver 140 (e.g., CONOPT). The CPLEX linear solver and AMPL/CONOPT interface/non-linear solver are commercially available software tools.

The GHOCES tool uses constrained optimization, in which the algorithms are broken down to equations in the form that the GHOCES tool can understand:

$$y_d \geq a_d x_d + b_d$$

where d indicates that all numbers are decimal (fixed point) numbers. More complicated equations can be used, such as polynomials, equations with more than one variable, etc. A parser is used to break down these equations to a series of equations in the form above.

Figure 2:
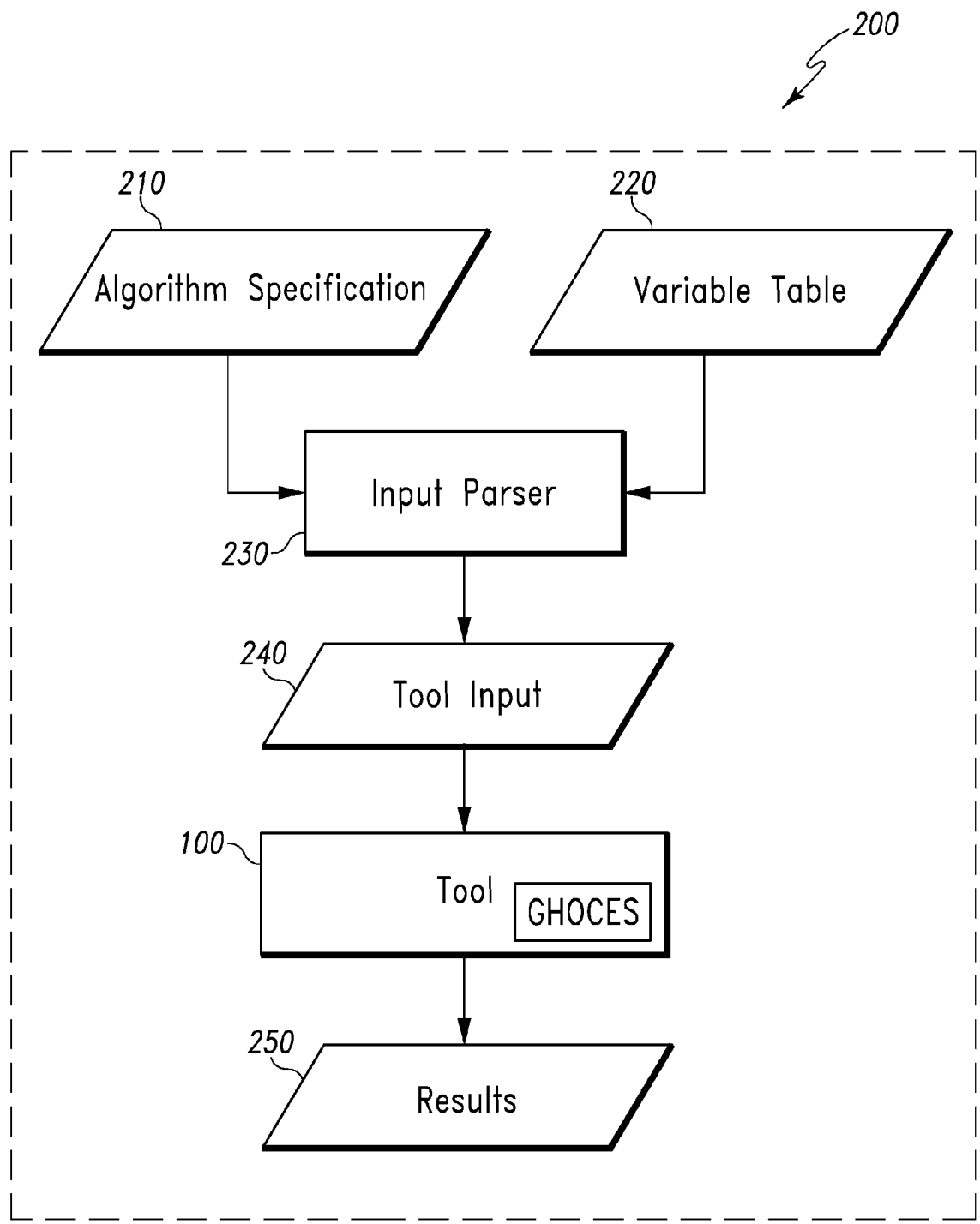
FIG. 2 is a data processing flow chart illustrating the operation of the method of the invention for overflow analysis.

FIG. 2 is a data processing flow chart illustrating the operation of the method of the invention for overflow analysis in a microprocessor device 200 that can be embedded in an IMU. As shown, a compensation algorithm specification 210 (e.g., in Microsoft WORD) is provided for equations with scaling information. A variable table 220 (e.g., in Microsoft EXCEL) of lower and upper bounds for each algorithm variable is also provided. The lower bound is the minimum required range and is set by statistical analysis, analytical determination, or known IMU operational requirements. The upper bound is defined by fixed point scaling of the variable.

The algorithm specification 210 and variable table 220 send data to an input parser 230 for fixed point algorithms, which includes a subdivision algorithm. The input parser 230 analyzes the scaling information in the equations, shifts, and knowledge of the variables' scaling from the variable constraint input. The input parser 230 then converts the scaled equations into a system of decimal equations that are sent to a tool input 240. The tool input 240 feeds the equation data to GHOCES tool 100 for analysis to determine an optimum range for the algorithm variables. The results of the analysis 250 are then made available to microprocessor device 200.

Rules for Constraint Expressions

The equations used in the overflow analysis are written in a format that can be parsed and satisfies the input format and logic for the parser. The following general rules apply. All quantities are assumed to be nonnegative (positive), since the analysis is looking at the worst case scenario. Recursive equations have to be reformulated since no iterative or dynamic expressions are allowed. Equal signs are replaced by 'greater than or equal' signs since the right side of the equation defines the lower bound of the variable on the left side of the expression. Arrays are not used, so the constraint equations are defined in either a pseudo-single-axis system or in vector space, as needed. Assumptions are also made for cross-axis compensations. For calibration coefficients and matrices, the largest element is used. For logic statements, the taken branch (if deterministic) is used. Otherwise the largest possible output from all branches is used.

The constraints are based on variables, which with their scaling and their needed range either explicitly expressed by the requirements on range for input variables or implicitly through the equations (actually inequalities), define the bounds for internal or output variables.

GHOCES Variable Types

Variables are constrained by both a table of lower bound (needed range) and a table of upper bound (maximum range). The upper bound is by definition equal to the fixed point scaling range of the parameter or variable. The lower bound is constrained by the range needed for the data represented by the variable.

Input variables are from the sensors on the IMU, such as gyroscope frequencies, accelerometer frequencies, temperature, and other voltage sources. The input variables have their lower bound defined by the input specification, preceding processing, etc. Each input variable has to be analyzed to find its real maximum value. When using the Excel variable constraint table, the input variables have their minimum range specified and are labeled as type internal. Also, except in certain circumstances, explicit limits may be needed to prevent input variables from exceeding their defined bounds.

Intermediate variables include all variables that are computed through the internal algorithm computations. The lower bounds of the intermediate variables are defined by the equations that determine the bounds of the operand variables. The GHOCES tool will constrain the upper bound of such variables to their indicated fixed point scaling. In the Excel variable constraint table, the intermediate variables have their minimum range entered as 'unspecified' and are labeled as internal.

Output variables are treated the same as intermediate variables. The output variables in the algorithm specification are in general not the output variables of the IMU. These outputs specify the operational range of the algorithm output. To verify that the IMU does not have an overflow problem, the output computations for the IMU must also be analyzed.

Calibration coefficients are variables defined in the calibration memory. The lower bound of these variables is determined based on calibration data statistics. In previous analysis, the lower bound has been determined as the absolute values of the mean plus three sigma or the largest magnitude of the experienced maximum or minimum, whichever of these two are the largest. Once the analysis has been performed using these constraints, any calibration generating coefficient larger than the constraint will violate the overflow analysis. In the Excel variable constraint table, the calibration coefficients have their minimum range entered as the numerical value of the lower bound and have no label. For the case when a calibration coefficient is not used but is still part of the algorithms, and thus has no requirement on its lower bound, its minimum range can either be set to zero or to 'unspecified.' No label should be entered in this case.

Constants do not vary during IMU operation. Most of the constants are reconfigurable through the configuration memory. For the constants, the upper and lower range constraints are identical. The numerical value of the constant is entered as the minimum range. The label is 'constant' in the constraint table input.

GHOCES Constraints

The constraints (lower bound) for calibration coefficient ranges were determined using statistical data from 438 samples of IMUs (146 calibration runs) to define appropriate ranges. Almost all coefficients were normally distributed. The coefficient ranges were computed as:

$$tol = \pm \max(|\mu+6\sigma|, |\mu-6\sigma|)$$

Options configurable via an IMU configuration table were used as constant inputs. These included, for example, rate structure, filter coefficients, and compensations enabled/disabled.

As discussed previously, dynamic equations are not allowed and need to be reformulated. Thus, the constraints for infinite impulse response (IIR) filters were determined by reformulating the filters to apply a gain from the unfiltered input to the filtered output. The maximum gain can be computed analytically based on the form of the filter and the specific filter coefficients. This gain applies to all of the filtered outputs, including all of the past values.

During coning and sculling corrections, vectors are assumed to be orthogonal such that the vector cross products have maximum magnitude.

The GHOCES optimization tool was used to generate an overflow analysis solution based on the variable constraint table and the equations defined in the algorithm specification. The constraint table included constraints on the input values to the algorithms. Equations written in a form that the parser did not handle can be reformulated. A common example is when the parser assigns the same variable both as an input variable and an intermediate or output variable. The equation can be reformulated using knowledge of the computational intent so as to eliminate such anomalous variables. This example is given to illustrate the present invention, and is not intended to limit the scope of the invention.

The present invention may be embodied in other specific forms without departing from its essential characteristics. The described embodiments and methods are to be considered in all respects only as illustrative and not restrictive. The scope of the invention is therefore indicated by the appended claims rather than by the foregoing description. All changes that come within the meaning and range of equivalency of the claims are to be embraced within their scope.

What is claimed is:

1. A method of determining ranges for algorithmic variables for a processor that uses fixed point arithmetic, the method comprising:
expressing overflow requirements of processor instructions as inequalities;
expressing precision requirements and expressiveness requirements as inequalities and merit functions; and
using a global constraint and optimizer tool to find ranges for the algorithmic variables based on the inequalities and the merit functions, wherein the algorithmic variables include input variables comprising gyroscope frequencies or accelerometer frequencies.

2. The method of claim 1, wherein the inequalities and merit functions expressing the requirements are quadratic.

3. The method of claim 1, wherein the input variables further comprise temperatures.

4. The method of claim 1, wherein the algorithmic variables further comprise intermediate variables.

5. The method of claim 4, wherein the intermediate variables comprise variables that are computed through internal algorithm computations.

6. The method of claim 1, wherein the algorithmic variables further comprise output variables, calibration coefficients, or constants.

7. The method of claim 1, further comprising reformulating the algorithmic variables to eliminate variables common to both sides of the inequalities.

8. The method of claim 1, wherein the processor comprises an embedded microprocessor located in an inertial measurement unit.

9. The method of claim 1, wherein the tool comprises a global hybrid optimal constraint equation solver.

10. The method of claim 9, wherein the global hybrid optimal constraint equation solver comprises:
a subdivision algorithm;
a linear solver in operative communication with the subdivision algorithm;
a solver interface in operative communication with the subdivision algorithm; and
a non-linear solver in operative communication with the solver interface.

11. The method of claim 2, wherein the tool comprises a global hybrid optimal constraint equation solver for quadratic inequalities and quadratic merit functions.

12. The method of claim 11, wherein the global hybrid optimal constraint equation solver comprises:
a subdivision algorithm;
a linear solver in operative communication with the subdivision algorithm;
a solver interface in operative communication with the subdivision algorithm; and
a non-linear solver in operative communication with the solver interface.

13. A method of performing overflow analysis for a processor that uses fixed point arithmetic, the method comprising:
providing a compensation algorithm for scaled equations;
providing an algorithm variable table of lower bounds and upper bounds for a set of algorithm variables, wherein the algorithm variables include input variables comprising gyroscope frequencies or accelerometer frequencies;
transmitting data from the compensation algorithm and the algorithm variable table to an input parser for fixed point algorithms;
converting the scaled equations into decimal equations; and
analyzing the decimal equations with a global constraint and optimizer tool to determine an optimum range for the algorithm variables.

14. The method of claim 13, wherein the lower bounds comprises a minimum required range for the algorithm variables, and the upper bounds comprises a fixed point scaling of the algorithm variables.

15. The method of claim 13, wherein the tool comprises a global hybrid optimal constraint equation solver.

16. The method of claim 15, wherein the global hybrid optimal constraint equation solver comprises:
a subdivision algorithm;
a linear solver in operative communication with the subdivision algorithm;
a solver interface in operative communication with the subdivision algorithm; and
a non-linear solver in operative communication with the solver interface.

17. A non-transitory computer readable medium having instructions stored thereon for implementing a method of determining ranges for algorithmic variables for a processor that uses fixed point arithmetic, the method comprising:
- expressing overflow requirements of processor instructions as quadratic inequalities;
- expressing precision requirements and expressiveness requirements as quadratic inequalities and quadratic merit functions; and
- using a global constraint and optimizer tool to find ranges for the algorithmic variables based on the quadratic inequalities and the quadratic merit functions, wherein the algorithmic variables include input variables comprising gyroscope frequencies or accelerometer frequencies.

18. The non-transitory computer readable medium of claim 17, wherein the tool comprises a global hybrid optimal constraint equation solver.

19. The non-transitory computer readable medium of claim 18, wherein the global hybrid optimal constraint equation solver comprises:
- a subdivision algorithm;
- a linear solver in operative communication with the subdivision algorithm;
- a solver interface in operative communication with the subdivision algorithm; and
- a non-linear solver in operative communication with the solver interface.

* * * * *